US011431957B2

(12) United States Patent
Ito

(10) Patent No.: US 11,431,957 B2
(45) Date of Patent: Aug. 30, 2022

(54) FILE GENERATION APPARATUS, FILE GENERATION METHOD, PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Hironao Ito, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/122,931

(22) Filed: Dec. 15, 2020

(65) Prior Publication Data

US 2021/0105450 A1 Apr. 8, 2021

Related U.S. Application Data

(63) Continuation of application No. PCT/JP2019/023224, filed on Jun. 12, 2019.

(30) Foreign Application Priority Data

Jun. 20, 2018 (JP) .............................. JP2018-116888

(51) Int. Cl.
| H04N 13/172 | (2018.01) |
| H04N 13/111 | (2018.01) |
| G06F 21/60 | (2013.01) |
| H04L 67/02 | (2022.01) |

(52) U.S. Cl.
CPC ......... *H04N 13/172* (2018.05); *G06F 21/602* (2013.01); *H04N 13/111* (2018.05); *H04L 67/02* (2013.01)

(58) Field of Classification Search
USPC .......................................................... 348/38
See application file for complete search history.

(56) References Cited

U.S. PATENT DOCUMENTS

| 7,595,833 B2* | 9/2009 | Calisa .................. H04N 5/9206 348/333.01 |
| 2011/0292045 A1* | 12/2011 | Nakamura ........... H04N 13/128 345/419 |
| 2013/0083173 A1* | 4/2013 | Geisner .................. G09G 3/003 348/51 |
| 2013/0315558 A1* | 11/2013 | Nakamura ........... H04N 13/243 386/230 |
| 2016/0232939 A1* | 8/2016 | Malamal Vadakital ..................... G11B 27/309 |

(Continued)

FOREIGN PATENT DOCUMENTS

| JP | 2017211828 A | 11/2017 |
| JP | 2017212591 A | 11/2017 |

(Continued)

*Primary Examiner* — Behrooz M Senfi
(74) *Attorney, Agent, or Firm* — Canon U.S.A., Inc. IP Division

(57) ABSTRACT

A file-processing apparatus 20 acquires (S104) access information that is used for requesting material data for generating a virtual viewpoint image that is generated based on a virtual viewpoint and captured images acquired from a plurality of imaging apparatuses, generates (S107) a virtual viewpoint image file that contains the acquired access information and a virtual viewpoint image data corresponding to the virtual viewpoint image, and outputs (S108) the generated virtual viewpoint image file.

17 Claims, 19 Drawing Sheets

(56) References Cited

U.S. PATENT DOCUMENTS

2019/0356906 A1* 11/2019 Handa .................. G06T 15/205
2020/0234495 A1* 7/2020 Nakao ................ H04N 21/6587

FOREIGN PATENT DOCUMENTS

JP 2018513574 A 5/2018
WO 2016/128613 A1 8/2016

* cited by examiner

FIG. 10

ADDITIONAL INFORMATION ABOUT CAMERA INFORMATION USED FOR PROCESSES

| Tag Name | Field Name | Type | Count |
|---|---|---|---|
| Version of DAI Tag | PUC Version ID | BYTE | 4 |
| Access Information Flag | Access Information Flag | LONG | 1 |
| Number of Data Base URL Characters | Database URL Character Num | LONG | 1 |
| Data Base URL | Database URL | ASCII | Any |
| Data Base IP Address | Database IP Address | ASCII | Any |
| Data ID | Data ID | LONG | 1 |
| Data Name Number of Characters | Data Name Character Num | LONG | 1 |
| Data Name | Data Name | ASCII | Any |
| Number of Image Generation Portal Site URL characters | Video Create Portal Site URL Character Num | LONG | 1 |
| Image Generation Portal Site URL | Video Create Portal Site URL | ASCII | Any |
| Data Use Start Time | Start Time Of Using Data | LONG | 1 |
| Data Use End Time | End Time Of Using Data | LONG | 1 |

FILE GENERATION APPARATUS, FILE GENERATION METHOD, PROCESSING APPARATUS, AND NON-TRANSITORY COMPUTER-READABLE STORAGE MEDIUM

CROSS-REFERENCE TO RELATED APPLICATIONS

This application is a Continuation of International Patent Application No. PCT/JP2019/023224, filed Jun. 12, 2019, which claims the benefit of Japanese Patent Application No. 2018-116888, filed Jun. 20, 2018, both of which are hereby incorporated by reference herein in their entirety.

BACKGROUND OF THE INVENTION

Field of the Invention

The present invention relates to processing of a virtual viewpoint image file.

Background Art

A known method for creating a virtual viewpoint image depending on the position of a virtual camera and direction of view from a virtual camera is based on imaged images that are acquired by using cameras.

Japanese Patent Laid-Open No. 2017-211828 discloses that data of, for example, a foreground texture image, a background texture image, and a 3D model (referred to below as material data) is generated based on images that are captured by using cameras, and that a virtual viewpoint image is generated by using the material data.

CITATION LIST

Patent Literature

PTL 1 Japanese Patent Laid-Open No. 2017-211828

It is not easy for a device that acquires virtual viewpoint image data to generate new virtual viewpoint image data related to a new virtual viewpoint.

In some cases, for example, a user who views a virtual viewpoint image that is generated based on virtual camerawork that is set by another person wants to generate an original virtual viewpoint image based on another virtual camerawork. In these cases, it is thought that the address of material data for generating the virtual viewpoint image is investigated, the material data is acquired, and new virtual viewpoint image data is generated, but this creates complicated work. There is also possibility that if the material data is not found, the new virtual viewpoint image data cannot be generated.

SUMMARY OF THE INVENTION

The present invention has been accomplished in view of the above problem, and it is an object of the present invention to enables a device that acquires virtual viewpoint image data to readily generate new virtual viewpoint image data related to a new virtual viewpoint.

To solve the above problem, a file generation apparatus according to the present invention has, for example, a structure described below. That is, the file generation apparatus comprises: an acquisition unit configured to acquire access information that is used for requesting material data for generating a virtual viewpoint image that is generated based on a virtual viewpoint and captured images acquired from a plurality of imaging apparatuses; a file generation unit configured to generate a virtual viewpoint image file that contains the access information that is acquired by the acquisition unit and a virtual viewpoint image data corresponding to the virtual viewpoint image; and an output unit configured to output the virtual viewpoint image file that is generated by the file generation unit.

Further features of the present invention will become apparent from the following description of exemplary embodiments with reference to the attached drawings.

BRIEF DESCRIPTION OF THE DRAWINGS

FIG. 10 illustrates an example of tag information of the access information for the material data.

DESCRIPTION OF THE EMBODIMENTS

First Embodiment

Figure 1:
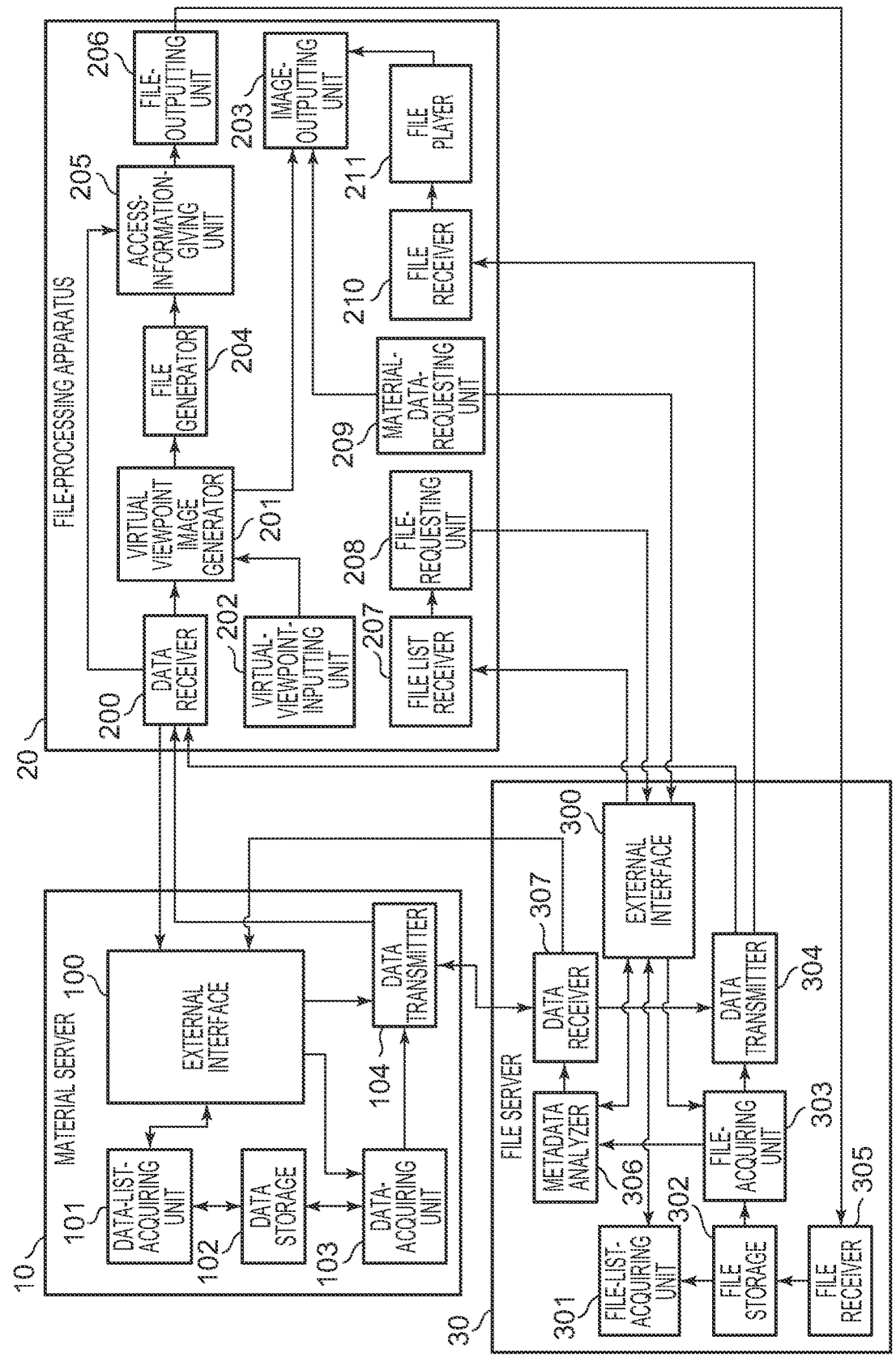
FIG. 1 illustrates a functional block diagram according to a first embodiment.
Figure 16:
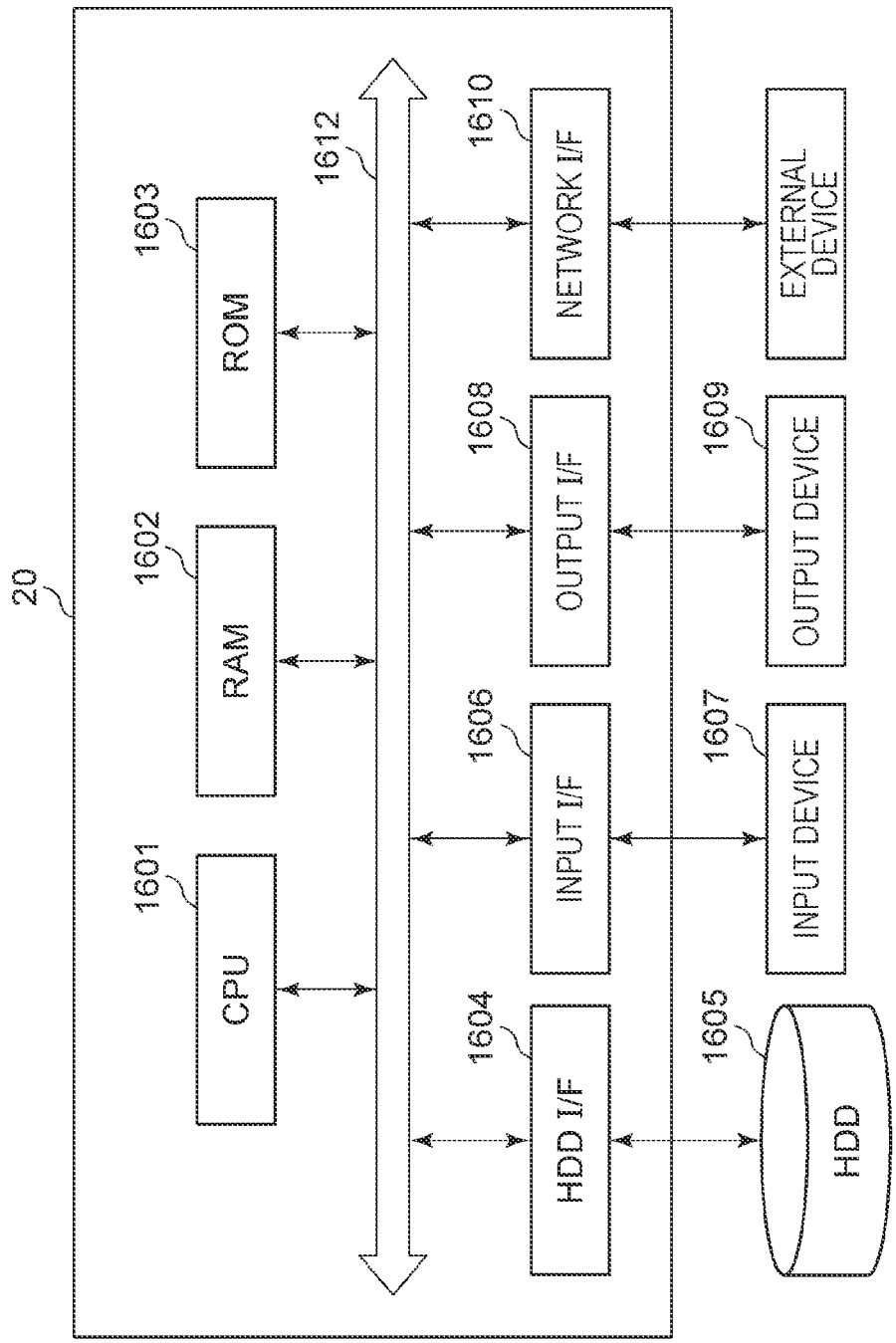
FIG. 16 illustrates the hardware configuration of a file-processing apparatus 20.

FIG. 1 is a block diagram illustrating the functions of a material server 10, a file-processing apparatus 20, and a file server 30 according to a first embodiment. The functions of the devices according to the present embodiment are performed by hardware resources illustrated in FIG. 16. FIG. 16 illustrates the hardware configuration of the file-processing apparatus 20, and the hardware configurations of the material server 10 and the file server 30 are the same as that of the file-processing apparatus 20. In FIG. 16, a CPU 1601 uses a RAM 1602 as a work memory and runs programs that are stored in a ROM 1603 and/or a hard disk drive (HDD) 1605. Consequently, various processes described later are performed. A HDD interface (I/F) 1604 is an interface for connecting the file-processing apparatus 20 and a secondary storage device such as a HDD 1605 or an optical disk drive to each other. An input interface (I/F) 1606 is an interface for connecting an input device 1607 such as a scanner, a digital camera, a mouse, a keyboard, or a touch screen for inputting one or more coordinates and the file-processing apparatus 20 to each other. The input interface (I/F) 1606 is, for example, a serial bus interface such as a USB or IEEE1394. An output interface (I/F) 1608 is an interface for connecting an output device 1609 such as a display and the file-processing apparatus 20 to each other. A network interface (I/F) 1610 is an interface for connecting the file-processing apparatus 20 and external devices (for example, the material server 10 and the file server 30) to each other. The CPU 1601 can communicate external device data by using the network I/F 1610.

The file-processing apparatus 20 may include the CPUs 1601. The file-processing apparatus 20 may include exclusive one or pieces of hardware that differ from the CPU 1601, and the exclusive hardware may perform at least part of processing of the CPU 1601. Examples of the exclusive hardware include a GPU (Graphics Processing Unit), an ASIC (an application specific integrated circuit), a FPGA (a field-programmable gate array), and a DSP (a digital signal processor).

Figure 3:
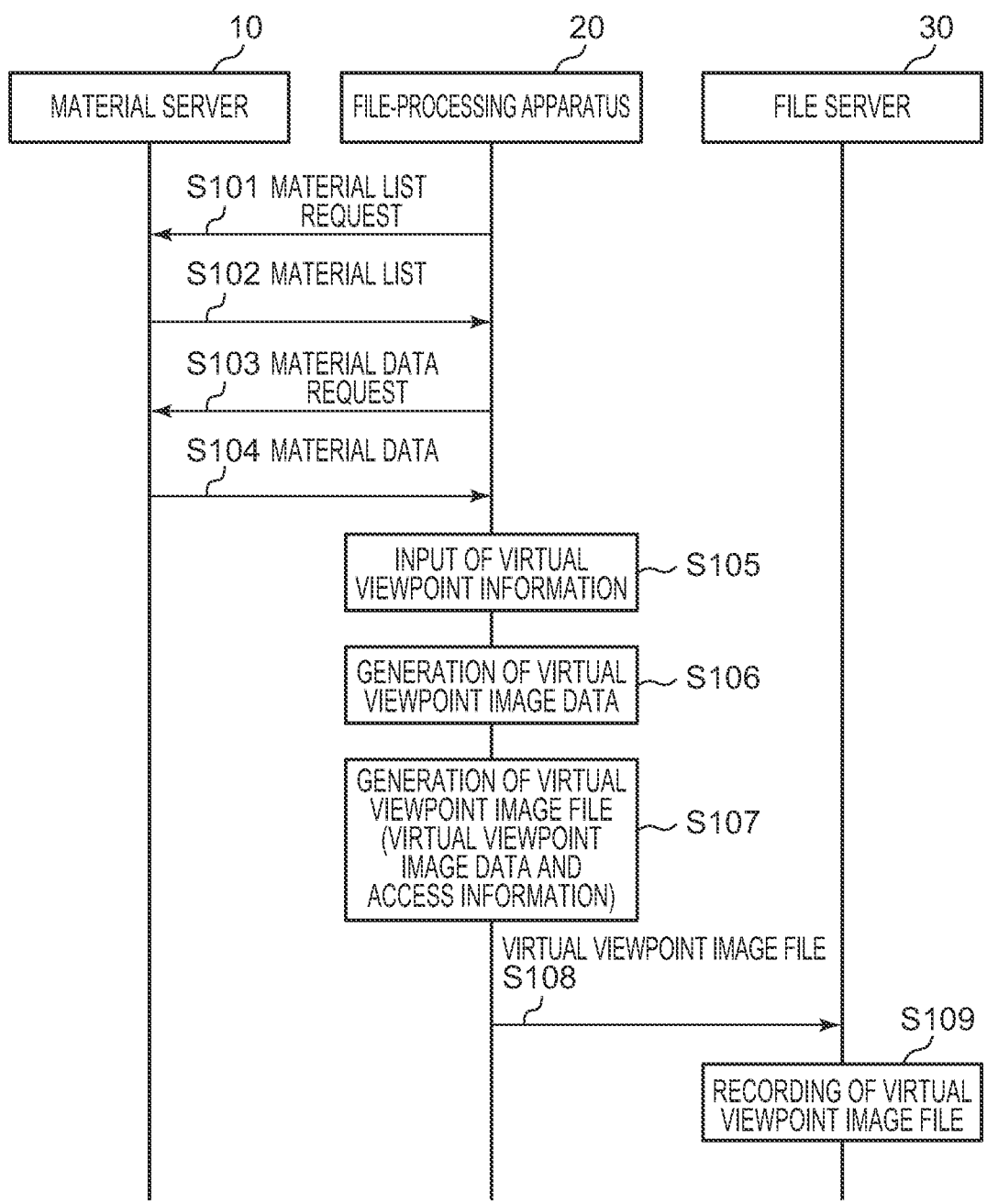
FIG. 3 is a sequence diagram of generation of a virtual viewpoint image file.

FIG. 3 is a sequence diagram illustrating the flow of processes of the material server 10, the file-processing apparatus 20, and the file server 30 when a virtual viewpoint image file is generated. The functions and operation of the devices will now be described with reference to FIG. 1 and FIG. 3.

The file-processing apparatus 20 requests a material list from the material server 10 (S101). Specifically, a data receiver 200 in the file-processing apparatus 20 transmits a request for the material list to an external interface 100 in the material server 10 in response to a user operation input. According to the present embodiment, the material list means data of a list of material data that can be provided by the material server 10.

Figure 2:
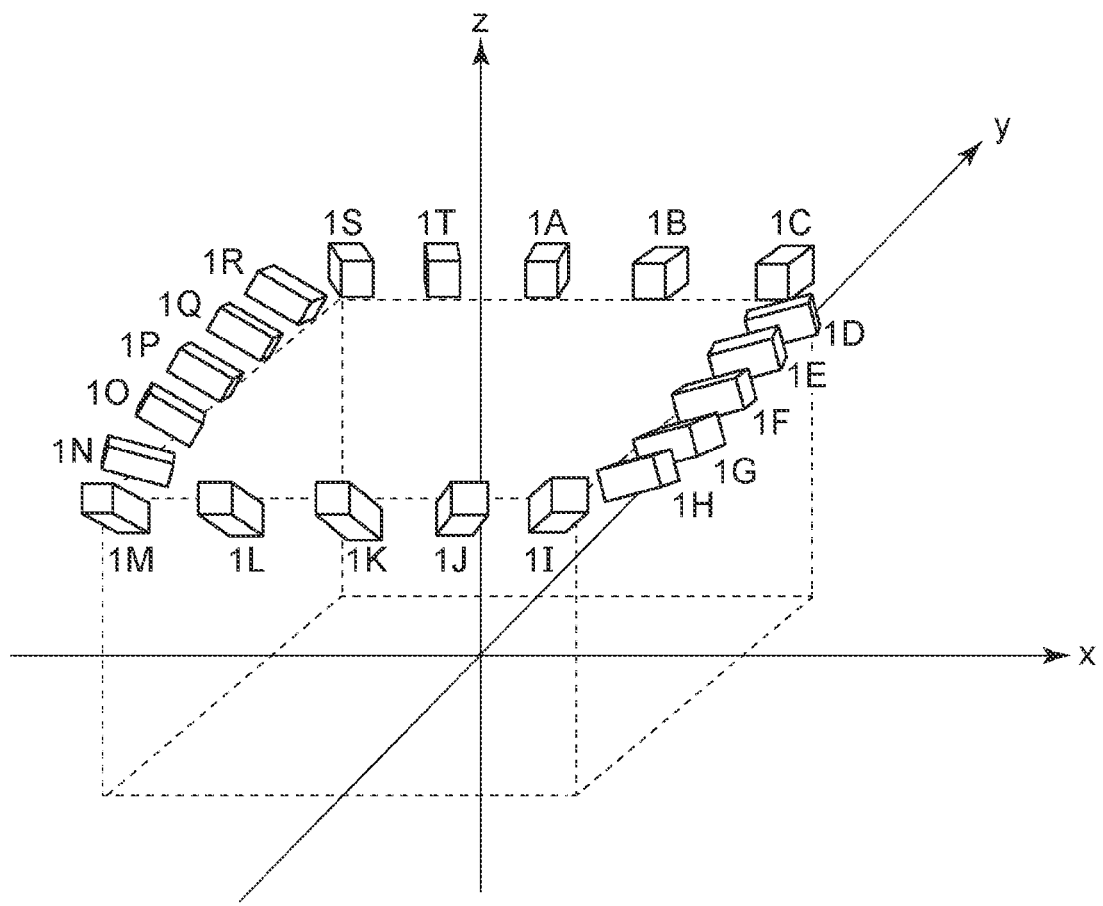
FIG. 2 illustrates a capture system.

According to the present embodiment, the material data means data that is used for generating a virtual viewpoint image. Examples of the material data include three-dimensional shape data that represents a three-dimensional shape of an object (for example, a sports player or a ball), the texture data of the object, and the texture data of a background image. The virtual viewpoint image depending on the position of a virtual viewpoint and direction of view from a virtual viewpoint (a virtual camera) can be generated by using the material data. Other examples of the material data may include images that are captured by cameras and camera information about the positions, postures, and angles of view of the cameras. The virtual viewpoint image depending on the position of a virtual viewpoint and direction of view from a virtual viewpoint (the virtual camera) can be generated by using the material data. The material data is acquired by using an imaging system illustrated in FIG. 2. As illustrated in FIG. 2, the shape and texture data of an object in a capture region is acquired by using captured images that are acquired by synchronously capturing the images of a predetermined capture region in different directions with the cameras. A known method such as a visual hull can be used as a specific algorism. The camera information about the positions, postures, and angles of view of the cameras illustrated in FIG. 2 can be acquired based on, for example, the images that are captured by the cameras.

The material list according to the present embodiment contains access information for requesting the kind of the material data that can be provided, a time zone, a capture location, and the material data. According to the present embodiment, the name of the material list is used, but data in the form of a list is not necessarily used. The whole of the information described above (the kind, the time zone, the capture location, and the access information) is not necessarily essential. Part of the information described above may not be contained in the material list, and another information may be added.

The access information can include, for example, a URL (a Uniform Resource Locator) that represents the IP address of a recording device (the material server 10) that records the material data or the address of the material data. The access information may also include, for example, the name (a file name) of a file that contains the material data, or identification information (for example, a title) for identifying the material data, or both.

At S102 in FIG. 2, the file-processing apparatus 20 receives the material list from the material server 10. Specifically, the external interface 100 of the material server 10 acquires the material list from a data storage 102 by using a data-list-acquiring unit 101 when the request for the material list is received and transmits the material list to the data receiver 200 of the file-processing apparatus 20.

The file-processing apparatus 20 requests the material data from the material server 10 (S103). Specifically, the data receiver 200 of the file-processing apparatus 20 transmits a request for the material data to the external interface 100 of the material server 10 in response to a user operation for selection of the material data.

The file-processing apparatus 20 receives the material data from the material server 10 (S104). Specifically, the external interface 100 of the material server 10 acquires the material data from the data storage 102 by using a data-acquiring unit 103 when the request for the material data is received from the file-processing apparatus 20. The material data is transmitted to the data receiver 200 of the file-processing apparatus 20.

The file-processing apparatus 20 acquires virtual viewpoint information (S105). Specifically, an input of the virtual viewpoint information about, for example, the position of the virtual viewpoint, the direction of view from the viewpoint, and the angle of view of the virtual viewpoint is received from a virtual-viewpoint-inputting unit 202. According to the present embodiment, the virtual viewpoint information is determined based on a user operation but is not limited thereto. The virtual camera may be automatically operated.

A virtual viewpoint image generator 201 in the file-processing apparatus 20 generates virtual viewpoint image data based on the material data that is acquired at S104 and the virtual viewpoint information that is inputted at S105 (S106).

A file generator 204 in the file-processing apparatus 20 generates the virtual viewpoint image file based on the virtual viewpoint image data that is generated at S106 (S107). The file-processing apparatus 20 according to the present embodiment generates the virtual viewpoint image file that contains access information about the request for the material data that is used for generating the virtual viewpoint image data. In an example illustrated in FIG. 1, an access-information-giving unit 205 adds the access information after the file generator 204 generates the virtual viewpoint image file but is not limited thereto. For example, the virtual viewpoint image data may be added after the virtual viewpoint image file that stores the access information is generated.

The file-processing apparatus 20 outputs the virtual viewpoint image file that is generated at S107 to the file server 30 (S108). Specifically, a file-outputting unit 206 in the file-processing apparatus 20 transmits the virtual viewpoint image file to a file receiver 305 in the file server 30.

The file server 30 records the virtual viewpoint image file that is received from the file-processing apparatus 20 (S109). The recorded virtual viewpoint image file is provided to another file-processing apparatus 20 (for example, a smartphone or a tablet PC) when opened to the public.

The destination of the virtual viewpoint image file to be outputted is not limited to the file server 30. For example, the virtual viewpoint image file may be outputted to a hard disk that is connected to the file-processing apparatus 20 or may be outputted to another terminal (for example, a smartphone or a tablet PC).

In the example illustrated in FIG. 1, the material server 10, the file-processing apparatus 20, and the file server 30 are connected but are not limited thereto, and various modifications can be made. For example, the material server 10 and the file server 30 may be the same (or substantially the same) server, or the system can include multiple material servers 10 and multiple file servers 30. For example, in the case where there are the multiple material servers 10, the file-processing apparatus 20 can transmit the request for the material list to the multiple material servers 10. In the case where there are the multiple file servers 30, the file-processing apparatus 20 can transmit the virtual viewpoint image file to the multiple file servers 30. In the example illustrated in FIG. 1, the file-processing apparatus 20 has a function of generating the virtual viewpoint image file and a function of playing back the virtual viewpoint image file but is not limited thereto. That is, the function of generating the virtual viewpoint image file and the function of playing back the virtual viewpoint image file can be performed by respective different devices. That is, the file-processing apparatus 20 according to the present embodiment can also be referred to as a file generation apparatus or a file playback device.

It is assumed that the file-processing apparatus 20 according to the present embodiment generates the virtual viewpoint image data after the whole of the material data that is designated by a user is collectively received. However, the virtual viewpoint image data may be generated while a piece of the material data for a predetermined time is acquired.

Figure 4:
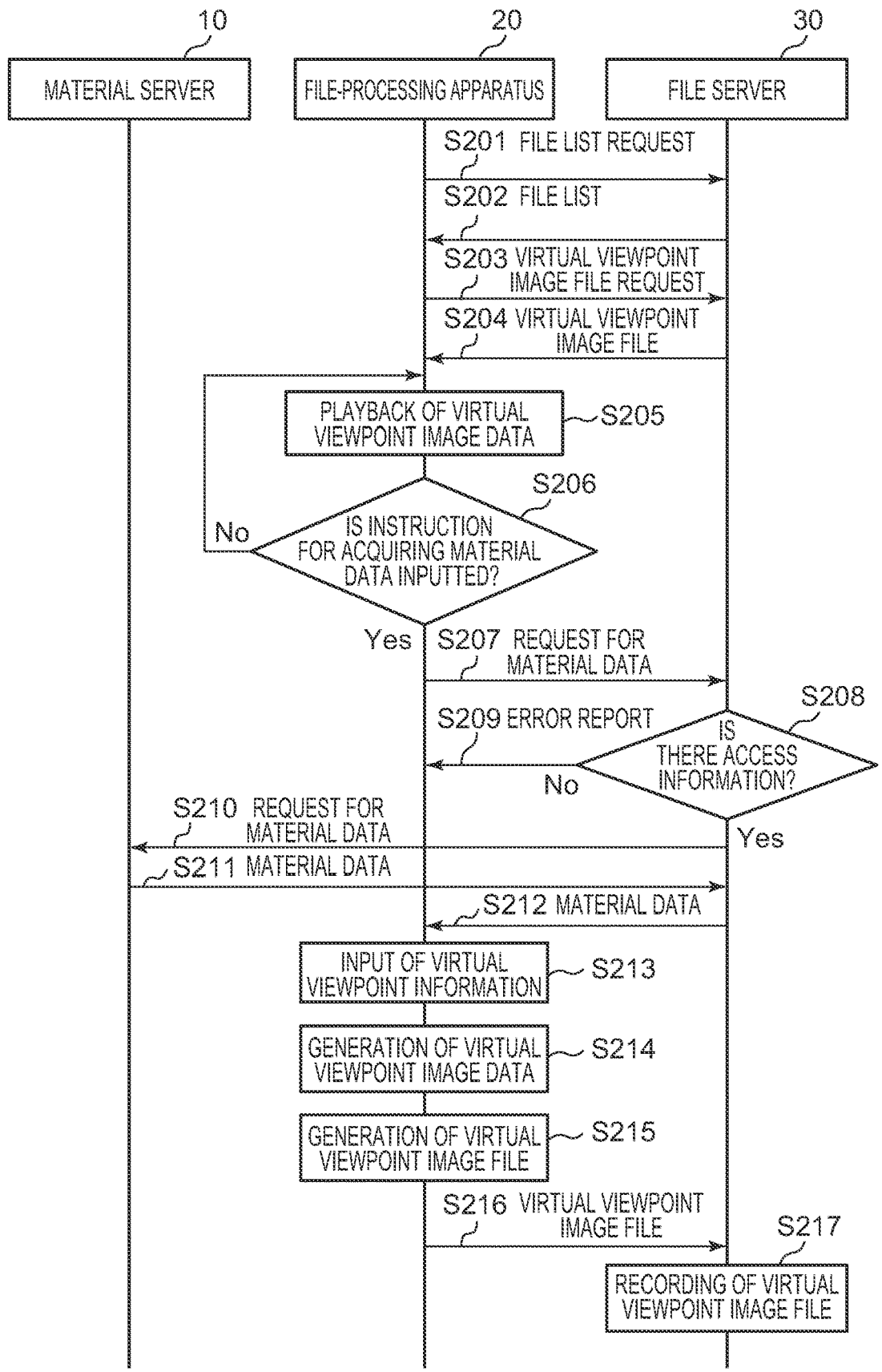
FIG. 4 is a sequence diagram of playback of the virtual viewpoint image file.

The flow of processes of the material server 10, the file-processing apparatus 20, and the file server 30 when the file-processing apparatus 20 according to the present embodiment plays back the virtual viewpoint image file will now be described with reference to FIG. 1 and FIG. 4.

The file-processing apparatus 20 requests a file list from the file server 30 (S201). The file list means information that represents a list of content files that can be provided by the file server 30 to the file-processing apparatus 20. This is not necessarily data in the form of a list. The content files in the file list include the virtual viewpoint image file. A file list receiver 207 in the file-processing apparatus 20 according to the present embodiment transmits a request for the file list to an external interface 300 in the file server 30 when a user operation related to the acquisition of the file list is received.

The file-processing apparatus 20 acquires the file list from the file server 30 (S202). Specifically, the external interface 300 of the file server 30 acquires the file list from a file storage 302 by using a file-list-acquiring unit 301 when the request is received from the file-processing apparatus 20. The file list is transmitted to the file-processing apparatus 20.

The file-processing apparatus 20 transmits a request for the virtual viewpoint image file that is designated by the user among the content files in the file list to the file server 30 (S203). Specifically, a file-requesting unit 208 in the file-processing apparatus 20 transmits the request together with the identification information about the virtual viewpoint image file that is designated by the user to the external interface 300 of the file server 30.

The file-processing apparatus 20 receives the virtual viewpoint image file from the file server 30 (S204). Specifically, the external interface 300 of the file server 30 acquires the requested virtual viewpoint image file from the file storage 302 by using a file-acquiring unit 303 when the request for the virtual viewpoint image file is received from the file-processing apparatus 20. The acquired virtual viewpoint image file is transmitted to a file receiver 210 in the file-processing apparatus 20.

The file-processing apparatus 20 plays back the virtual viewpoint image file that is acquired at S204 (S205). Specifically, a file player 211 in the file-processing apparatus 20 decodes the virtual viewpoint image data that is contained in the virtual viewpoint image file that is received from the file receiver 210 and transmits the result of decoding to an image-outputting unit 203. The image-outputting unit 203 displays the virtual viewpoint image. At this time, audio data is also played back together with the image if needed.

The file-processing apparatus 20 determines whether an instruction for acquiring the material data is inputted (S206). The instruction for acquiring the material data is typically inputted by a user operation. The user inputs the instruction for acquiring the material data if the user wants to view an image from a viewpoint that differs from that of the image while the virtual viewpoint image based on the virtual viewpoint image file that is acquired from the file server 30 is played back. In the case where the instruction for acquiring the material data is not inputted, the playback of the virtual viewpoint image continues.

In the case where the instruction for acquiring the material data is inputted, the file-processing apparatus 20 requests the material data from the file server 30 (S207). Specifically, a material-data-requesting unit 209 in the file-processing apparatus 20 transmits a request for the material data to the file server 30 in response to a user operation input related to the acquisition of the material data. The material data is requested based on the access information for the material data. For example, in the case where the access information corresponds to a combination of the IP address and the file name of the material server 10, the access information is transmitted together with the request for the material data. For example, the access information is a URL, the material-data-requesting unit 209 can acquire the material data by transmitting a GET request for the URL. In this case, the GET request is not transmitted to the file server 30 but is directly transmitted to the material server 10 in some cases.

A metadata analyzer 306 in the file server 30 refers the access information that is transmitted together with the request when the request for the material data is received from the file-processing apparatus 20. In the case where the access information is not transmitted together with the request for the material data (No at S208), an error is reported to the file-processing apparatus 20 (S209). In the case where the access information is transmitted together with the request for the material data, the file server 30 transmits the request for the material data to the material server 10 (S210). Specifically, the request for the material data is transmitted from a data receiver 307 in the file server 30 to a data transmitter 104 in the material server 10. Subsequently, the file server 30 acquires the material data and the access information from the material server 10 (S211) and provides the material data and the access information to the file-processing apparatus (S212). However, the material data and the access information may be directly transmitted from the material server 10 to the file-processing apparatus 20. S213 to S217 in FIG. 4 are the same as S105 to S109 in FIG. 3.

Figure 5:
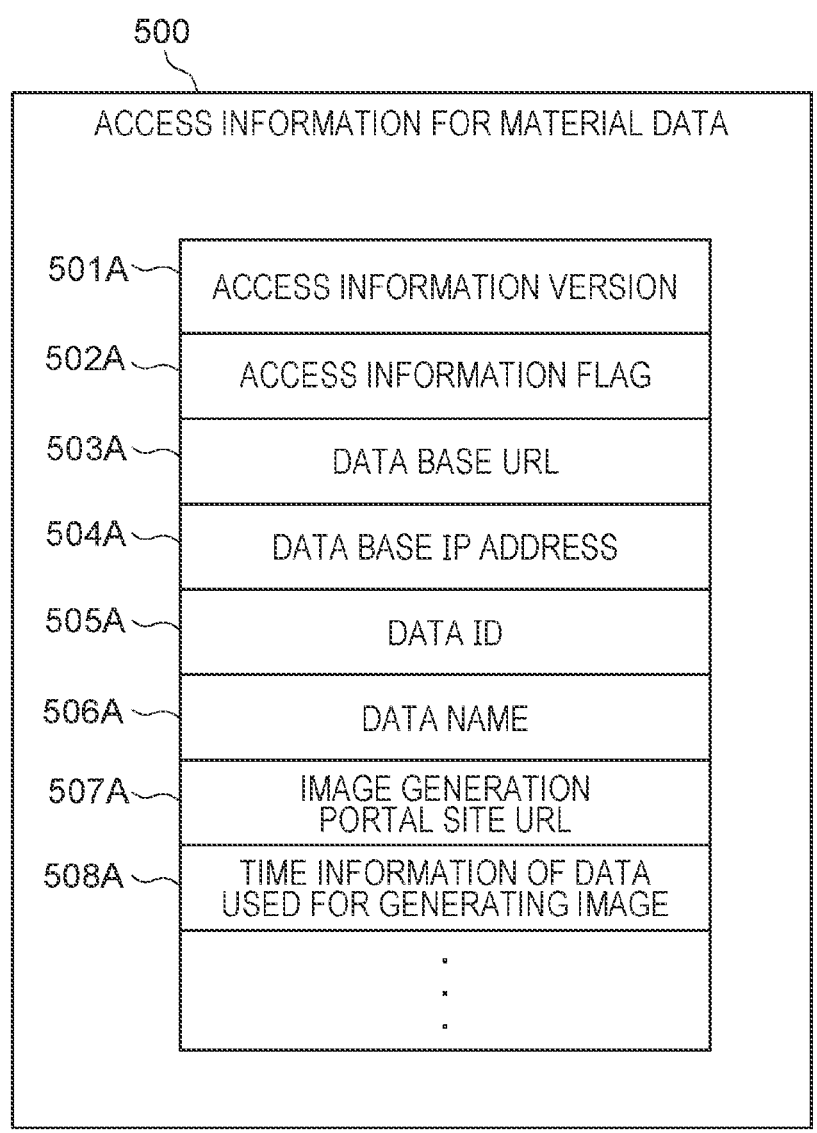
FIG. 5 illustrates access information for material data by way of example.

The access information for the material data will now be described in detail with reference to FIG. 5. In FIG. 5, an access information version 501A represents the version of access information 500 and is information that is used to handle differences in stored parameters between the versions.

An access information flag 502A represents valid information in the access information 500. For example, bit assignment data that uses two values one of which is 1 representing validity can be used.

A data base URL 503A represents the URL of the server (a data base) that records the material data. A data base IP address 504A represents the IP address of the server (the data base) that records the material data.

A data ID 505A is an ID (identification information) for uniquely identifying the material data on the server (the data base) that records the material data. A data name 506A is a data name (identification information) for uniquely identifying the material data on the server (the data base) that records the material data. Specific examples of the identification information include the title and file name of the material data.

An image generation portal site URL 507A is the URL of a portal site that has a function of generating the virtual viewpoint image. The site that is identified by the URL provides a service that can generate the virtual viewpoint image from the material data that is designated by the user.

Time information 508 of the data that is used for generating the image represents, for example, a start time and end time related to the virtual viewpoint image. The time information is based on the capture time of each actual camera related to the virtual viewpoint image. The use of the time information enables the user to play back virtual viewpoint images that are acquired at the same time.

It is to be noted that the whole of the information illustrated in FIG. 5 is not necessarily contained as the access information.

In an example that will now be described in detail, the access information is stored in a moving image file format conforming ISO/IEC14496-12 (MPEG-4 Part 12) ISO base media format (referred to below as ISOBMFF) standard.

Figure 6A:
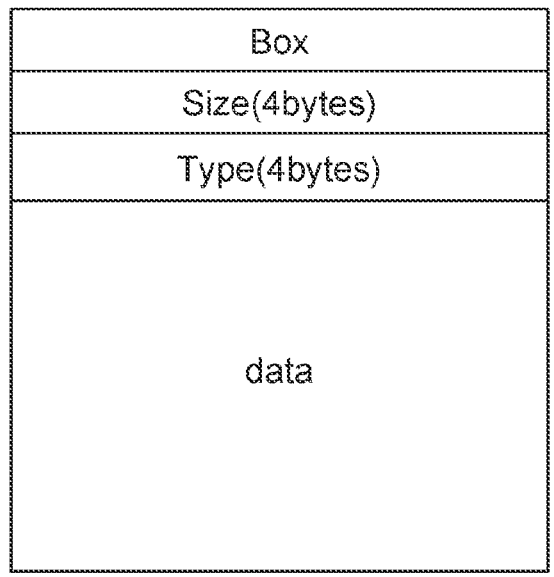
FIG. 6A illustrates an example of the structure of a box conforming ISOBMFF.
Figure 6B:
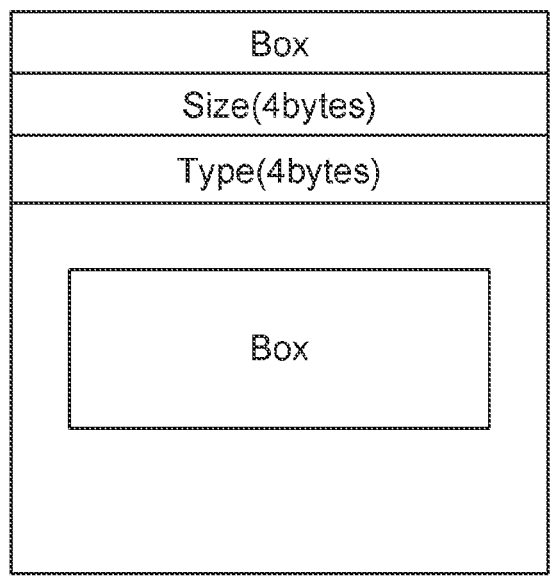
FIG. 6B illustrates an example of the structure of a box conforming the ISOBMFF.

According to the ISOBMFF, a file is handled in the unit of a box in which data and information representing a size and a type are stored. FIG. 6A illustrates the structure of the box by way of example. As illustrated in FIG. 6B, the box can include a box as data.

Figure 7:
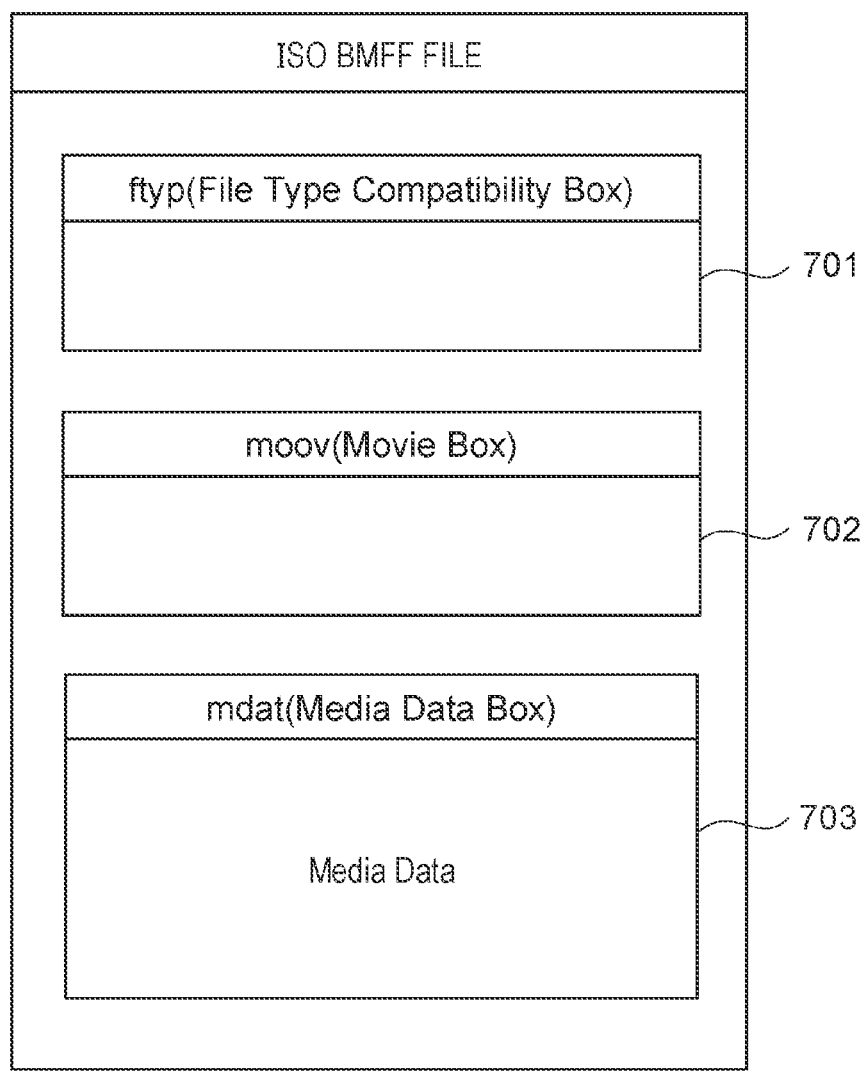
FIG. 7 illustrates an example of a file structure based on the ISOBMFF.

FIG. 7 illustrates the structure of the data of a file conforming the ISOBMFF. As illustrated in FIG. 7, the file conforming the ISOBMFF includes boxes of ftyp 701 (File Type Compatibility Box), moov 702 (Movie Box), and mdat 703 (Media Data Box). The ftyp 701 stores information about a file format, for example, the file conforming the ISOBMFF, the version of the box, the name of a maker that creates the file, and so on. The moov 702 (Movie Box) stores a time axis for managing media data and metadata such as an address. The mdat 703 (Media Data Box) stores the media data that is actually played back as a moving image. According to the present embodiment, the moov 702 can be referred to as a metadata region for storing the metadata, and the mdat 703 can be referred to as a media data region for storing the media data.

Figure 8A:
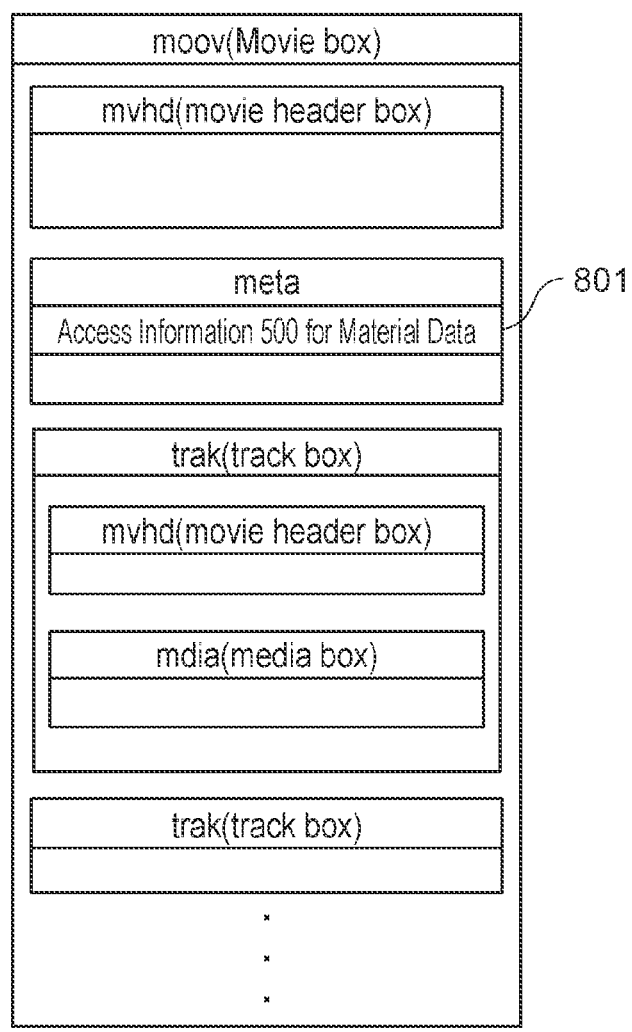
FIG. 8A illustrates an example in which the access information is stored in a movie box conforming the ISOBMFF.
Figure 8B:
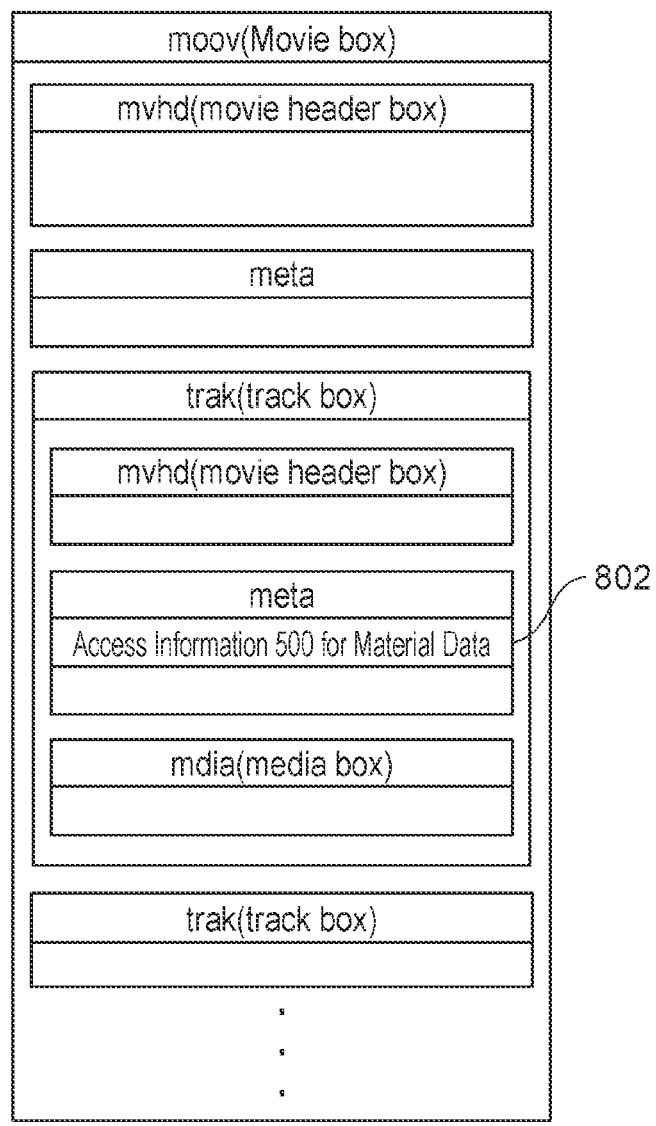
FIG. 8B illustrates an example in which the access information is stored in a movie box conforming the ISOBMFF.
Figure 8C:
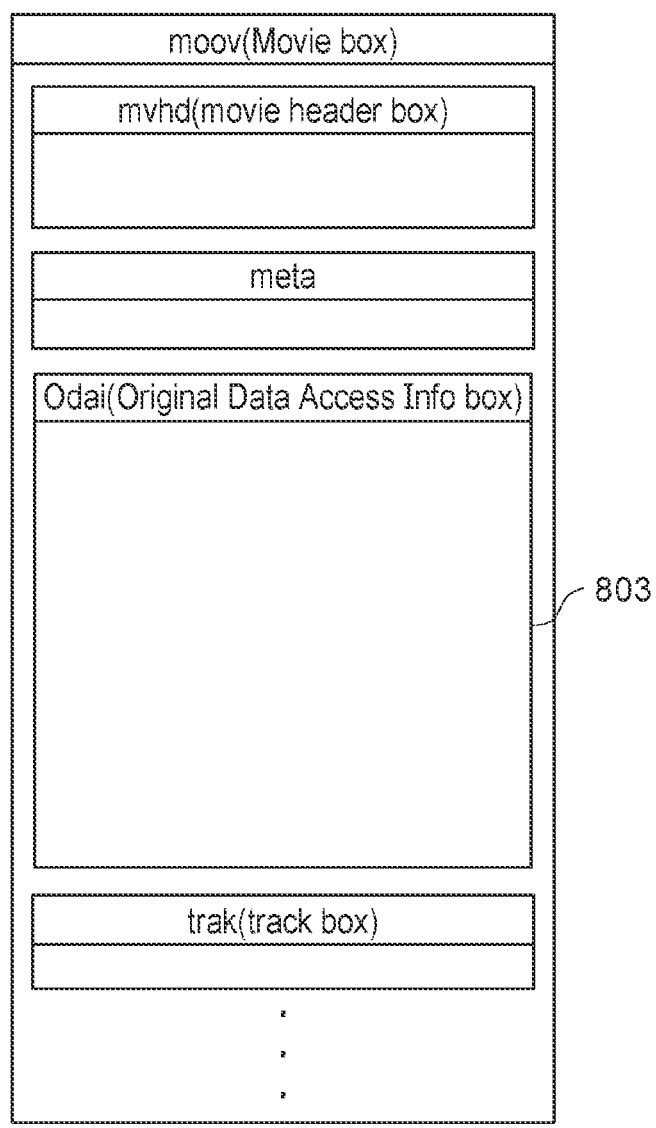
FIG. 8C illustrates an example in which the access information is stored in a movie box conforming the ISOBMFF.

FIG. 8 illustrate examples in which the access information 500 for the material data is stored in the moov 702. As illustrated in FIG. 8A, information can be given in meta 801 that represents metainformation about the entire file. In the case of a file that is edited by combining different images for every track, as illustrated in FIG. 8B, the access information 500 can be stored in a box meta 802 of each track. As illustrated in FIG. 8C, a new box for storing the access information 500 may be defined. This enables the material data to be accessed from each track even in the case where an edited moving image that includes a virtual viewpoint image that is generated from different material data is generated.

An example of the new box for storing the access information 500 will be described below:

```
aligned (8) class MetaBox (handler_type)
extends FullBox ('meta', version = 0,0) {
    HandlerBox (handler_type) theHandler;
    PrimaryItemBox primary_resource; // optional
    DataInformationBox file_locations; // optional
    ItemLocationBox item_locations; // optional
    ItemProtectionBox protections; // optional
    ItemInfoBox item_infos; // optional
    IPMPControlBox IPMP_control; // optional
    ItemReferenceBox item_refs; // optional
    ItemDataBox item_data; // optional
    Original_Data_Access_info // optional
    Box other_boxes [ ]; // optional
}.
```

Here, Original_Data_Access_info represents the access information 500 for the material data. This box is:

```
Box Type: 'odai'
Container: Metabox ('meta')
Mandatory: No
Quantity: Zero or one.
The syntax thereof is:
aligned (8) class ItemLocationBox extends FullBox ('odai', version, 0) {unsigned
int (32) offset_size;
unsigned int (32) length_size;
unsigned int (32) base_offset_size;
if (version == 1) {
unsigned int (32) index_size;
} else {
unsigned int (32) reserved;
unsigned int (32); //
}
for (i = 0, i < 4; i++) {
unsigned char (8) Information Version [i]; // access information version}
unsigned int (32) Access Info Flag; //access information flag
unsigned int (32) Database URL Character Num;
// the number of data base URL characters
for (i = 0, i < Database URL Character Num; i++) {
char (8) DatabaseURL [i]; / data base URL
}
for (i = 0, i < 15; i++) {
char (8) Database IPAddress [i]; //data base IP address
}
unsigned int (32) Data Name Character Num; // data name the number of characters
for (i = 0, i < Database Name Character Num; i++) {
```

-continued

```
char (8) Database Name [i]; // data name
}
unsigned int (32) Video Create Portal Site URL Character Num;
// image generation portal site URL the number of characters
for (i = 0, i < Video Create Portal Site URL Character Num; i++) {
char (8) Video Create Portal Site URL [i];
// image generation portal site URL
}
unsigned int (32) Start Time Of Using Data; //data use start time
unsigned int (32) End Time Of Using Data; //data use end time
}.
```

The access information 500 includes the boxes and may be separately set as illustrated in FIG. 8C. The ISOBMFF is an example, and the access information 500 may be stored as metadata in a file conforming another file format.

Figure 9A:
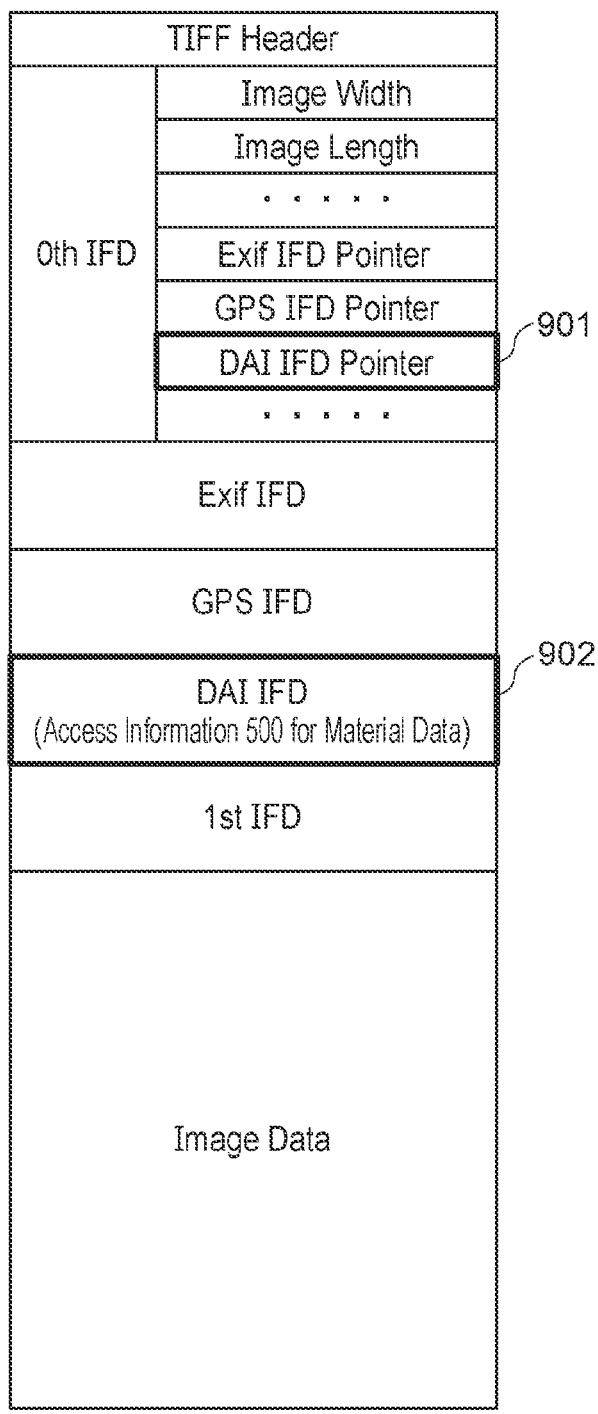
FIG. 9A illustrates an example of a method of storing the access information in a still image format.

In an example that will now be described, the access information 500 is stored in a format conforming DC-008-2012 digital still camera image file format standard Exif 2.3 of Camera & Imaging Products Association. FIG. 9A illustrates an example in which the access information 500 is stored in a file format conforming the Exif standard.

In FIG. 9A, information about a used camera is defined as a data access info image file directory (referred to below as DAI IFD) 902, and the access information 500 for the material data is stored. FIG. 10 illustrates an example of the structure of tag information of the DAI IFD. DAI IFD Pointer 901 represents a pointer that points to DAI IFD 902.

In FIG. 10, Version of DAI Tag represents the version of the format of subsequent data, and the version has a value that begins with 1. Access Information Flag represents whether subsequent information is valid by using 1 or 0 in each bit and is expressed by a 4-byte unsigned integer. Number of Data Base URL Characters represents the number of characters of the data base URL and is expressed by a 4-byte unsigned integer. Data Base URL represents the URL of the data base and is expressed by ASCII. ASCII has 8 bits, or a byte, and contains a 7-bits ASCII code. Data Base IP Address represents the IP address of the data base and is expressed by the ASCII. Data ID represents an ID for uniquely identifying data and is expressed by a 4-byte unsigned integer. Data Name Number of Characters represents the number of data name characters and is expressed by a 4-byte unsigned integer. Data Name represents the data name and is expressed by the ASCII.

Number of Image Generation Portal Site URL characters represents the number of characters of the URL of an image generation portal site and is expressed by a 4-byte unsigned integer. Image Generation Portal Site URL represents the URL of the portal site that provides a service of generating the virtual viewpoint image and is expressed by the ASCII. Data Use Start Time and Data Use End Time represent the period of the material data with which the virtual viewpoint image is generated. The Data Use Start Time and the Data Use End Time are expressed by 4-byte unsigned integers and use a method of representing a time, a minute, a second, and a frame by using a decimal number in each byte. However, the order and a data length of the above information are not limited thereto. The whole of the information illustrated in FIG. 10 is not necessarily essential as the access information 500. The access information 500 can contain information other than the information illustrated in FIG. 10.

Figure 9B:
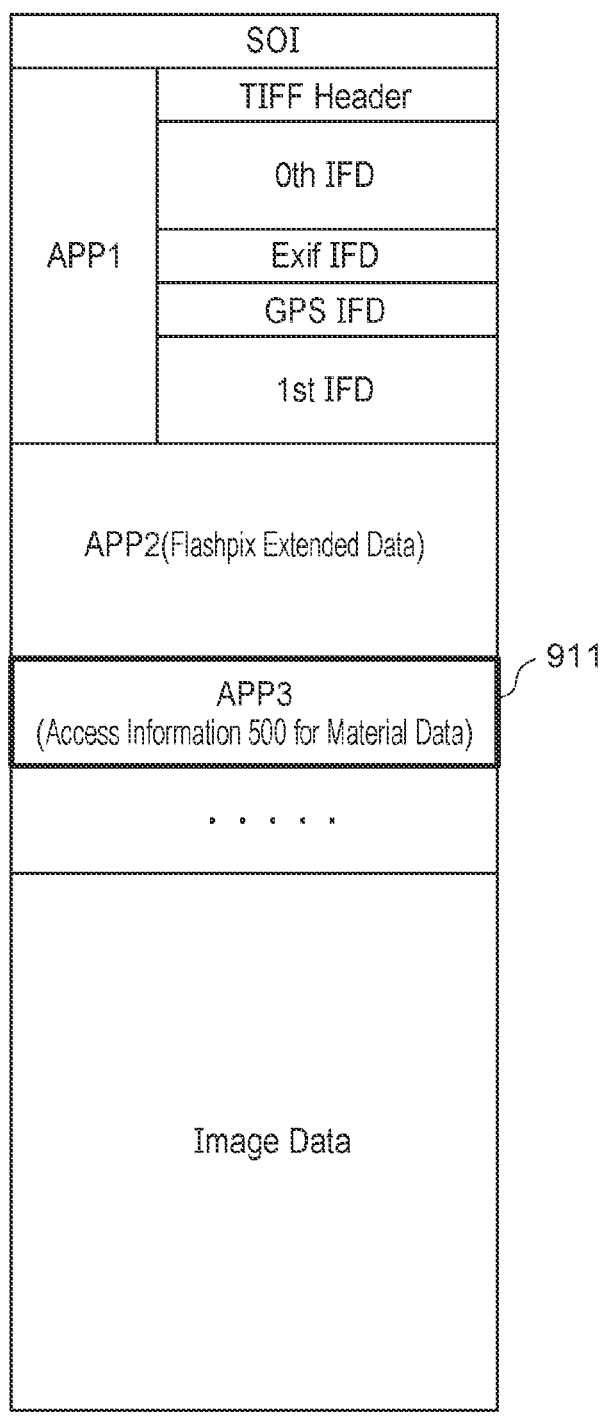
FIG. 9B illustrates an example of a method of storing the access information in the still image format.

In an example illustrated in FIG. 9B, the access information 500 is stored in a format conforming APP3 (911), which is an undefined APPn marker that is not defined by the Exif standard but can be freely used by a vendor or an industry group. A region for storing the access information 500 for the material data can thus be defined and added to the Exif standard that is an existing still image file format, and the virtual viewpoint image with a virtual viewpoint parameter can be generated.

In an example described according to the embodiment, the moving image format is the ISOBMFF standard, and the still image format is the Exif standard. However, the formats are not limited thereto and may be other standard formats or original formats. The values and expressions of parameters that are included in the access information 500 are not limited to the example described above.

In an example introduced this time, devices that are connected via a network cooperate with each other. However, in the case where a single device has the material data and the virtual viewpoint image that is generated from the material data, the access information for the material data can be expressed by a local folder path.

In an example that will now be described, the file-processing apparatus 20 operates as a client of a moving image delivery service that uses web pages as a moving image portal site. The file-processing apparatus 20 includes a web browser. The web browser analyzes web page data that is transmitted from the file server 30 and reconfigures a screen, and the user browses the moving image portal site.

Figure 11:
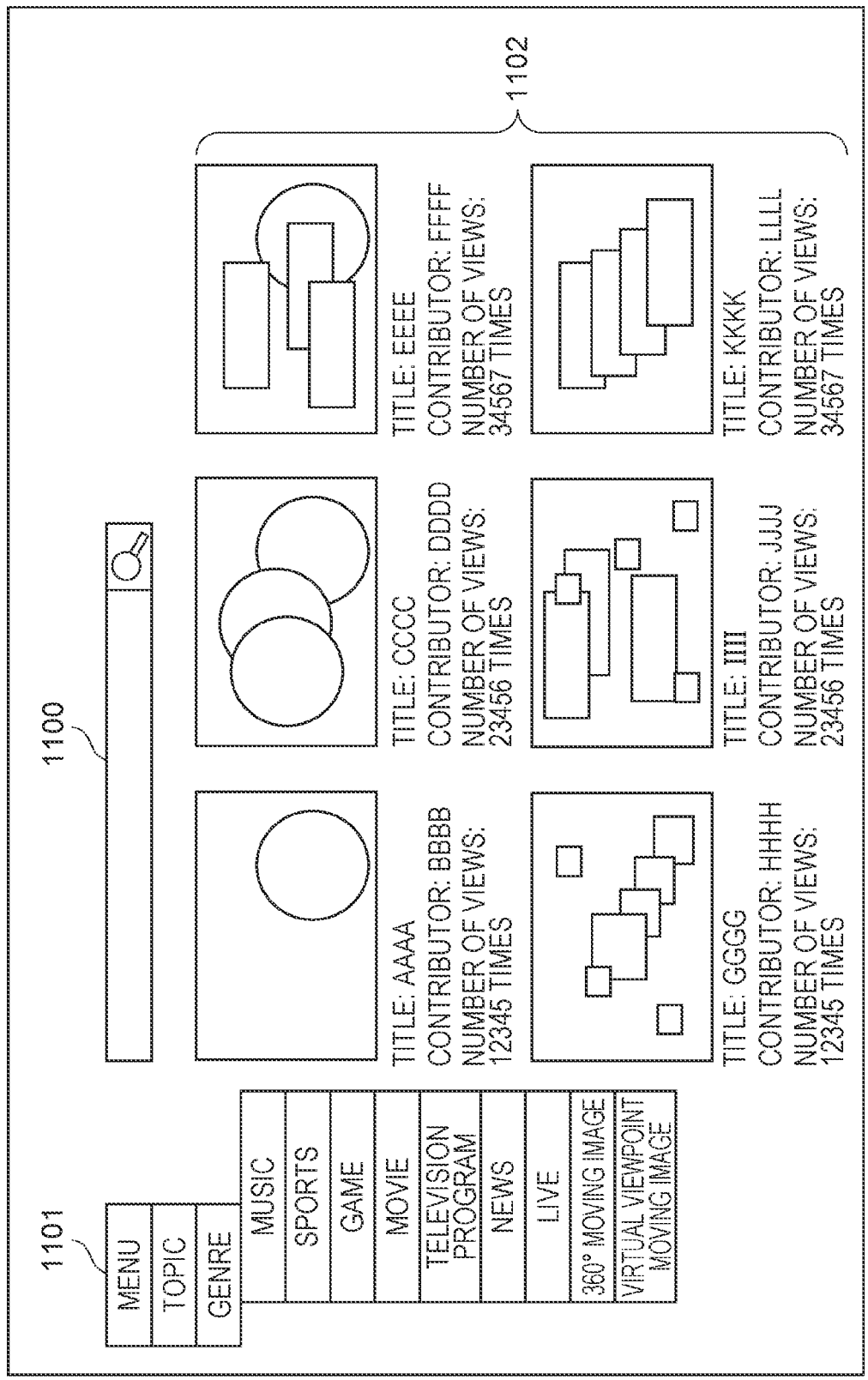
FIG. 11 illustrates an example of the top screen of a moving image portal site.

FIG. 11 illustrates an example of the top screen of the moving image portal site. The top screen includes a search bar 1100 that enables a moving image to be searched with a keyword, a menu screen 1101 that enables moving images of, for example, a genre to be searched, and a recommended-file list 1102. Each of moving images in the recommended-file list 1102 include a thumbnail screen, a title, a contributor, and the number of views. For example, when the user clicks a moving image with the mouse, a moving image playback screen is displayed.

Figure 12:
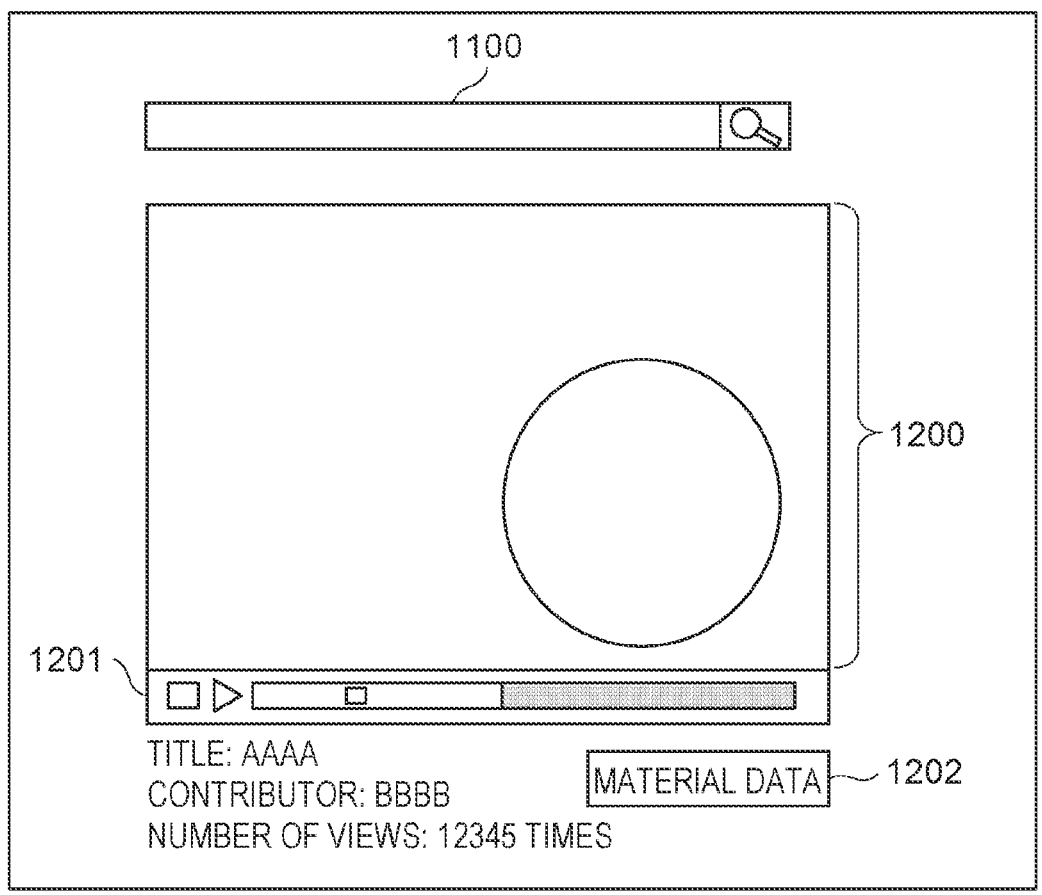
FIG. 12 illustrates an example of a moving image playback screen of the moving image portal site.

FIG. 12 illustrates an example of the moving image playback screen. The moving image playback screen includes a moving image window 1200 in which a moving image is displayed and a playback operation bar 1201 that includes a playback button, a stop button, and a seek bar for designating a temporal playback position. The moving image playback screen also includes an access button 1202 for the material data.

For example, the metadata analyzer 306 of the file server 30 according to the present embodiment determines whether the virtual viewpoint image file that is to be provided to the file-processing apparatus 20 contains the access information 500. If it is determined that the access information 500 is contained, the file server 30 can add the access button 1202 (a predetermined region) for the material data on the moving image playback screen that is displayed by the file-processing apparatus 20.

Figure 13:
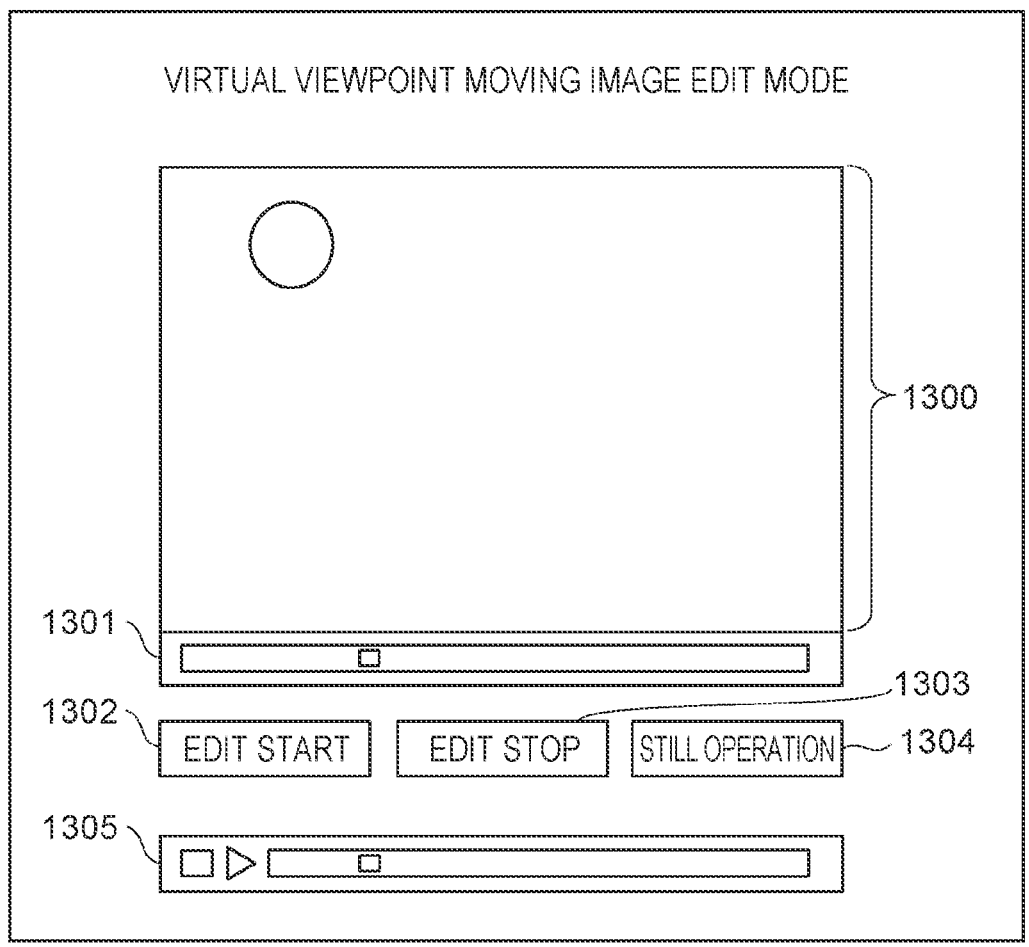
FIG. 13 illustrates an example of a generation screen of a virtual viewpoint image.

When the user wants to generate a virtual viewpoint image of a different viewpoint, based on the same material data as the virtual viewpoint image that is being played back, the access button 1202 for the material data is pressed (clicked). In response to the user operation, the material-data-requesting unit 209 requests the material data from the file server 30, and the material data is acquired from the file server 30 (or the material server 10) as described above. FIG. 13 illustrates an example of a screen for generating the virtual viewpoint image in a manner in which the file-processing apparatus 20 acquires the material data from the file server 30 (or the material server 10). The screen in FIG. 13 includes a window 1300 for playing back the virtual viewpoint image, a time designation bar 1301 for designating an edit target time, an edit start button 1302, an edit stop button 1303, a still operation button 1304, and a virtual viewpoint image playback bar 1305.

The user designates a time at which edit starts, by using the time designation bar 1301. When the edit start button 1302 is pressed, playback time starts increasing, and the user operates the virtual viewpoint by using the mouse or an exclusive controller. Consequently, the virtual viewpoint image is generated based on the original viewpoint. When the user presses the edit stop button 1303, the edit ends. The operation of the virtual viewpoint image playback bar 1305 enables the virtual viewpoint image that is newly generated to be checked.

According to the first embodiment described above, the virtual viewpoint image data and the virtual viewpoint image file that contains the access information 500 for accessing the material data that is used for generating the virtual viewpoint image data are generated. Consequently, the file-processing apparatus 20 that acquires the virtual viewpoint image file can access the material data, based on the access information and can readily generate the virtual viewpoint image of the different viewpoint.

In an example mainly described according to the present embodiment, the material data is acquired via the file server 30, but this is not a limitation. For example, the material-data-requesting unit 209 may have the function of the metadata analyzer 306, and the file-processing apparatus 20 may directly request the material data from the material server 10.

The access button 1202 for the material data is not limited thereto, and the possibility of the access to the material data may not directly expressed as in a "reconfigurable button" or an "edit button".

Second Embodiment

In an example mainly described according to the first embodiment, the file-processing apparatus 20 acquires the material data that is recorded in the material server 10 via the file server 30. In the description according to a second embodiment, however, the file-processing apparatus 20 directly acquires the material data from the material server 10.

Figure 14:
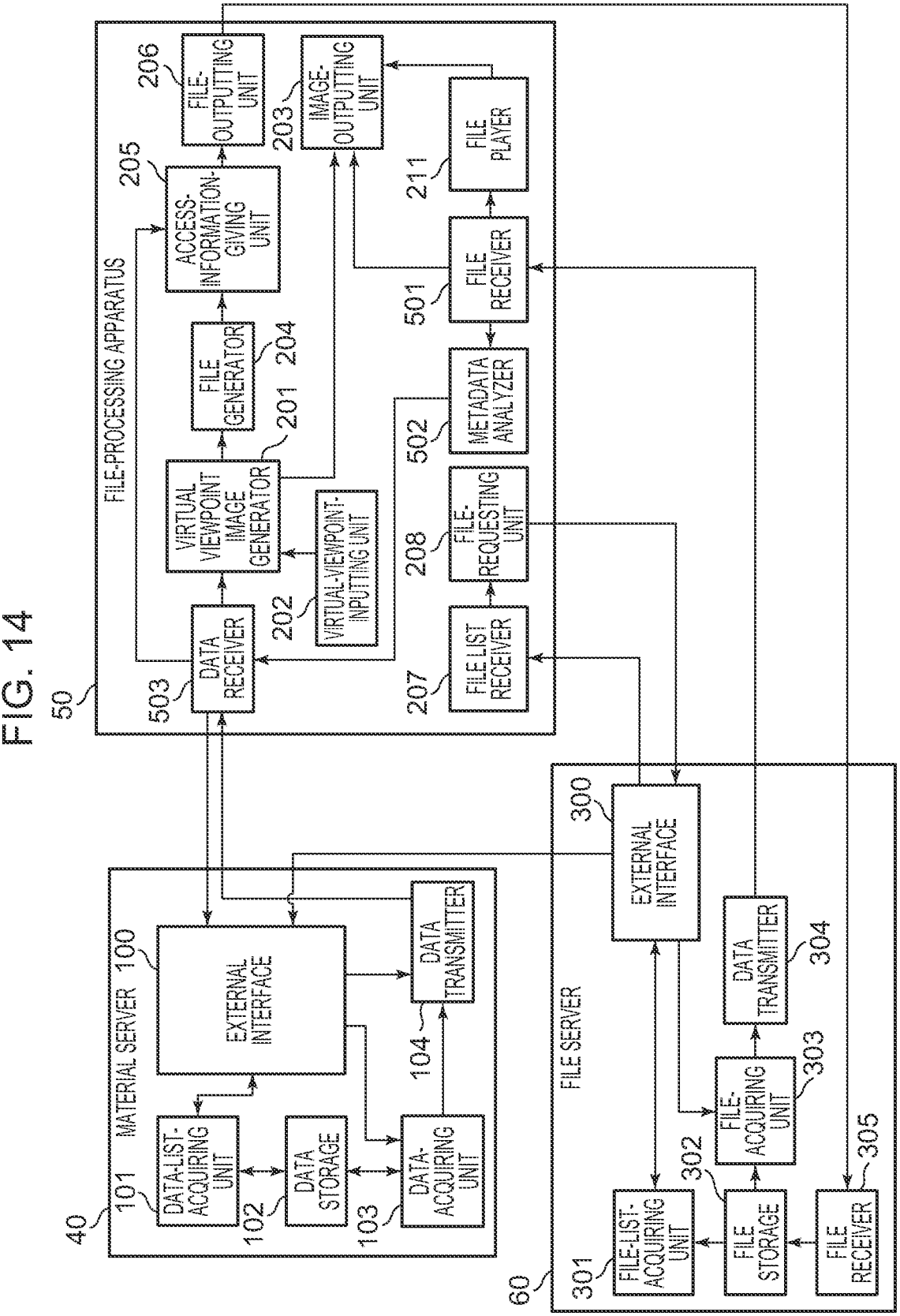
FIG. 14 illustrates a functional block diagram according to a second embodiment.

FIG. 14 illustrates a block diagram for describing a material server 40, a file-processing apparatus 50, and a file server 60 according to the second embodiment in detail. Blocks like to those in FIG. 1 are designated by like numbers, and a description thereof is omitted.

What is common between the first embodiment and the second embodiment is that the file-processing apparatus 50 outputs the virtual viewpoint image file that contains the virtual viewpoint image data and the access information for the material data to the file server 60.

In a case described according to the present embodiment, the file-processing apparatus 50 acquires the virtual viewpoint image file from the file server 60, acquires the material data from the material server 40, based on the access information that is contained in the file, and generates the virtual viewpoint image data, based on a new virtual viewpoint.

A file receiver 501 in the file-processing apparatus 50 transmits metadata in the virtual viewpoint image file to a metadata analyzer 502 in response to an input of a predetermined user operation (for example, an instruction for acquiring the material data).

The metadata analyzer 502 analyzes the metadata that is received from the file receiver 501 and extracts the access information for the material data of the virtual viewpoint image file. In the case where the access information for the material data is not contained in the metadata, the metadata analyzer 502 reports this to the file receiver 501. In this case, the image-outputting unit 203 displays an image that represents that the material data cannot be accessed. In the case where the access information is contained in the metadata, the metadata analyzer 502 transmits the access information to a data receiver 503. Specific examples of the access information are described above according to the first embodiment. That is, a combination of the IP address of the device (the material server 10) that records the material data and identification information (the data ID) for identifying the material data is acceptable. A URL that represents an address for specific material data is also acceptable as another example of the access information.

The data receiver 503 acquires the material data, based on the access information. For example, in the case where the access information includes the data ID and the IP address of the material server 40, the data receiver 503 requests the material data by designating the data ID from the external interface 100 of the material server 40.

The external interface 100 of the material server 40 acquires the material data from the data storage 102 by using the data-acquiring unit 103 and transmits the material data to the file-processing apparatus 50 via the data transmitter 104. The data receiver 503 of the file-processing apparatus 50 provides the material data that is received from the material server 40 to the virtual viewpoint image generator 201 and provides the access information to the access-information-giving unit 205. In this way, the access information for the material data that is used for the generation can be contained even in the case where the virtual viewpoint image file is generated based on the virtual viewpoint image data that is newly generated.

According to the second embodiment described above, the file-processing apparatus 50 analyzes the access information for the material data for generating the virtual viewpoint image and acquires the material data. In this way, the material data can be acquired without the file server 60. Accordingly, the time required for acquiring the material data can be decreased, and the load of the entire system can be reduced.

Other Embodiments

In the description according to the first and second embodiments, it is assumed that the three-dimensional shape of the foreground is colored based on a relationship in positions between a component (for example, a voxel) of the three-dimensional shape data of the object (the foreground) and a component (for example, a pixel) of a captured image. However, such a coloring process involves three-dimensional calculation and carries a high processing load. Accordingly, there is a possibility that the function of the file-processing apparatus 50 cannot be performed by a terminal such as a smartphone. In view of this, a method described below, for example, is used, and this enables the virtual viewpoint image to be generated even with a terminal that does not have high performance such as a smartphone.

The material server 40 determines the colors of the components of the three-dimensional shape data of an object in advance and generates colored three-dimensional shape data. The material server 40 provides the colored three-dimensional shape data as the material data to the file-processing apparatus 50. In this way, the virtual viewpoint image generator 201 of the file-processing apparatus 50 can omit a process of coloring the three-dimensional shape data.

A method of decreasing the processing load, for example, a method of decreasing an image size or a method of decreasing a frame rate may be used instead of the omission of the coloring process or in addition to the omission of the coloring process. The material data or a rendering method may be selected depending on the performance or load condition of a processing terminal (the file-processing apparatus 50).

The virtual viewpoint image file may be a file conforming the file format of a moving image, may be a file conforming the file format of a still image, or may be a file conforming the file format of an image sequence.

For example, still image data (the virtual viewpoint still image) and a still image file that contains the access information may be generated and provided to the file-processing apparatus 20. In this case, the file-processing apparatus 20 plays back a still image, based on the still image data. In response to an input of a predetermined user operation, the file-processing apparatus 20 may acquire the material data from the material server 10 and may generate a still image, based on an angle that differs from that of the still image. In this way, when the user wants to view the still image based on an angle at a different angle during playing back, for example, a new still image at the changed angle can be readily generated.

An image file that contains the access information for a still image that is not subjected to image processing may be provided to the file-processing apparatus 20 that performs the image processing such as a change in the image size, trimming, color adjustment. In this way, the original still image can be processed again. Similarly, as for a moving image, an image file that contains the access information for the moving image that is not subjected to image processing may be provided to a moving image processing device that performs processing such as a change in the image size, a change in the frame rate, trimming in a temporal direction.

Figure 15:
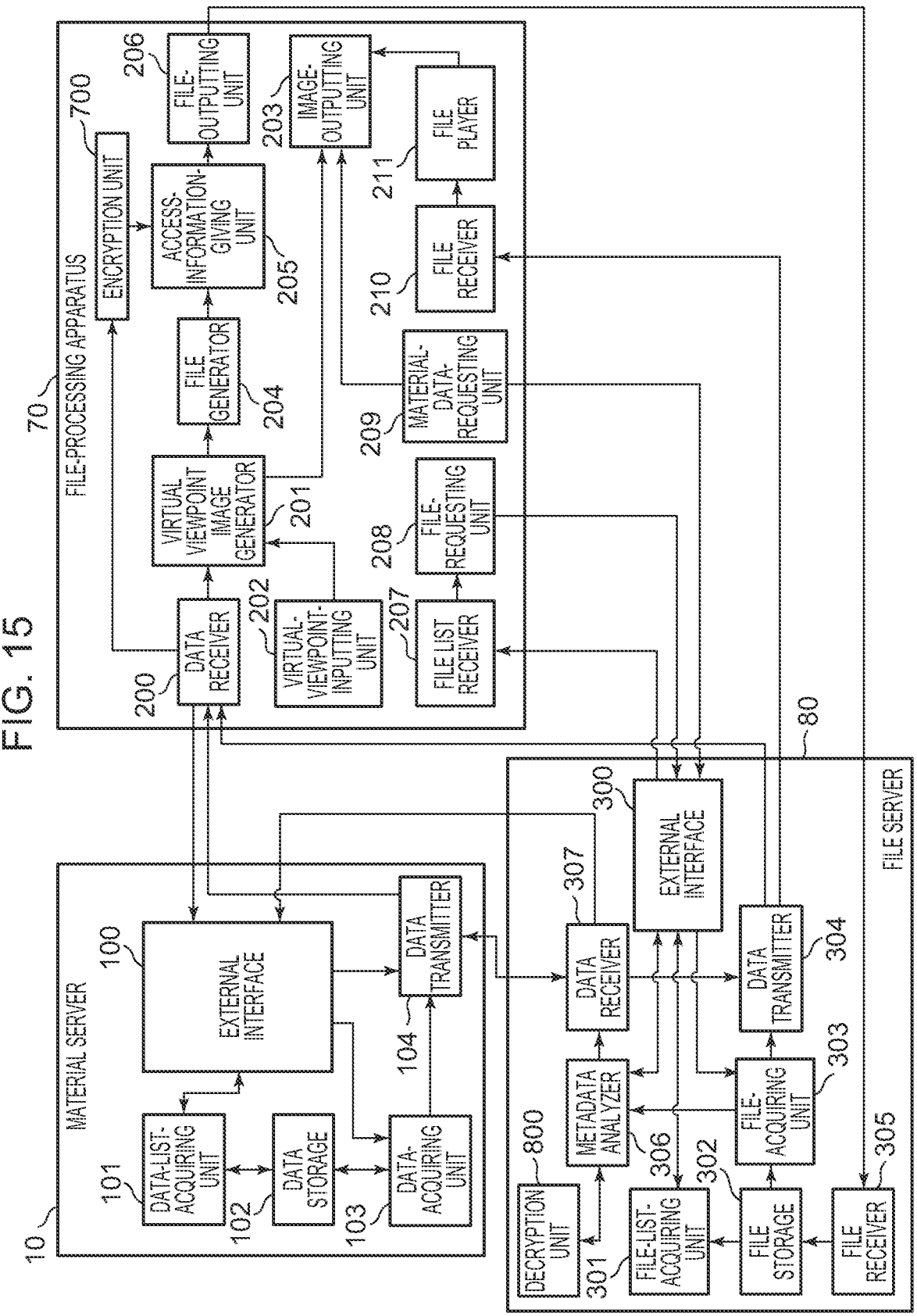
FIG. 15 illustrates a functional block diagram according to another embodiment.

The access information for the material data may be encrypted. FIG. 15 illustrates an example of a file-processing apparatus 70 that includes an encryption unit 700 that encrypts the access information for the material data and a decryption unit 800 that decrypts the access information for the material data. The file-processing apparatus 70 generates a virtual viewpoint image file that contains the access information for the material data that is encrypted by the encryption unit 700. The file-processing apparatus 70 sets the bit of identification of the access information flag to 1 in order to represent that the access information is encrypted. Here, the 31-th bit is used as the access information flag. In the case where the file-processing apparatus 70 requests the material data, a file server 80 checks the access information flag and determines whether the access information for the material data is encrypted when the access information for the material data is analyzed. If the access information for the material data is encrypted, the decryption unit 800 is requested to decrypt the access information for the material data, the access information for the material data that is decrypted is acquired, and the material data is accessed. This increases the confidentiality of the access information for the material data and prevents unauthorized access.

In examples described according to the above embodiments, the file-processing apparatus 20 has the function of generating the virtual viewpoint image file and the function of playing back the virtual viewpoint image file. However, these examples impose no limitations. For example, there may be a first file-processing apparatus (the file generation apparatus) that has only the function of generating the virtual viewpoint image file and a second file-processing apparatus that corresponds to the file-processing apparatus 20 in FIG. 1.

In examples mainly described according to the above embodiments, the file-processing apparatus 20 includes the virtual viewpoint image generator 201 and the file generator 204. However, this is not a limitation. For example, the file-processing apparatus 20 may acquire the virtual viewpoint image data and the access information from a virtual viewpoint image generation device and may generate the virtual viewpoint image file that contains the virtual viewpoint image data and the access information. The virtual viewpoint image data and the access information may be acquired from different devices. The material server 10 and the file server 30 may have a single body. It is to be noted that a system configuration in FIG. 1 has various modifications.

According to the present invention, a device that acquires virtual viewpoint image data can readily generate new virtual viewpoint image data related to a new virtual viewpoint.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A file generation apparatus comprises:
   one or more memories storing instructions; and
   one or more processors executing the instructions to:
   acquire a virtual viewpoint image that is generated based on a virtual viewpoint and material data, and access information for requesting the material data, the material data being obtained using a plurality of imaging apparatuses and being usable for generating another virtual viewpoint image corresponding to another virtual viewpoint;

generate a virtual viewpoint image file including the acquired access information and a virtual viewpoint image data corresponding to the acquired virtual viewpoint image; and output the generated virtual viewpoint image file.

2. The file generation apparatus according to claim 1, wherein the one or more processors further execute the instructions to input virtual viewpoint information for specifying a position of the virtual viewpoint and a direction of view from the virtual viewpoint; and generate the virtual viewpoint image, based on the inputted virtual viewpoint information.

3. The file generation apparatus according to claim 1, wherein the access information includes an IP address of a recording device that records the material data, an URL that represents an address of the material data, or both.

4. The file generation apparatus according to claim 1, wherein the access information includes a file name of a file that stores the material data, identification information for identifying the material data, or both.

5. The file generation apparatus according to claim 1, wherein the material data includes three-dimensional shape data of an object, texture data of the object, texture data of a background image, the captured images obtained by the plurality of imaging apparatuses, imaging apparatus information for specifying positions and postures of the imaging apparatuses, or some or all of these.

6. The file generation apparatus according to claim 1, wherein the virtual viewpoint image file has a metadata region and a media data region, and the access information included in the virtual viewpoint image file is stored in the metadata region, and the virtual viewpoint image data included in the virtual viewpoint image file is stored in the media data region.

7. The file generation apparatus according to claim 1, wherein the access information is acquired from a recording device that records the material data.

8. The file generation apparatus according to claim 1, wherein the access information is stored in a movie box in a moving image file format based on ISO/IEC14496-12.

9. The file generation apparatus according to claim 1, wherein the access information is stored in a format conforming Exif supporting a still image file format.

10. The file generation apparatus according to claim 1, wherein the one or more processors further execute the instructions to encrypt the access information, and the virtual viewpoint image file includes the encrypted access information.

11. A processing apparatus comprises:
one or more memories storing instructions; and
one or more processors executing the instructions to:
acquire a virtual viewpoint image file including virtual viewpoint image data generated based on captured images obtained by a plurality of imaging apparatuses and access information for specifying access of material data for generating a virtual viewpoint image corresponding to the virtual viewpoint image data;
specify the access information from the acquired virtual viewpoint image file;
request the material data by using the specified access information; and
generate another virtual viewpoint image data based on the requested material data and another virtual viewpoint that differs from a virtual viewpoint corresponding to the virtual viewpoint image data included in the acquired virtual viewpoint image file.

12. The processing apparatus according to claim 11, wherein the virtual viewpoint image file is acquired from a file server and the material data is requested to a material server different from the file server.

13. The processing apparatus according to claim 11, wherein the one or more processors further execute the instructions to:

play back the virtual viewpoint image data included in the acquired virtual viewpoint image file; and a receive a user operation into a region that is displayed on a playback screen for the virtual viewpoint image data, and the material data is requested in response to the received user operation.

14. A file generation method comprises:
acquiring a virtual viewpoint image that is generated based on a virtual viewpoint and material data, and access information for requesting the material data, the material data being obtained using a plurality of imaging apparatuses and being usable for generating another virtual viewpoint image corresponding to another virtual viewpoint;

generating a virtual viewpoint image file including the acquired access information and a virtual viewpoint image data corresponding to the acquired virtual viewpoint image; and outputting the generated virtual viewpoint image file.

15. A non-transitory computer-readable storage medium storing a program for performing a file generation method, the method comprises:

acquiring a virtual viewpoint image that is generated based on a virtual viewpoint and material data, and access information for requesting the material data, the material data being obtained using a plurality of imaging apparatuses and being usable for generating another virtual viewpoint image corresponding to another virtual viewpoint;

generating a virtual viewpoint image file including the acquired access information and a virtual viewpoint image data corresponding to the virtual viewpoint image; and outputting the generated virtual viewpoint image file.

16. A generation method comprises:
acquiring a virtual viewpoint image file including virtual viewpoint image data generated based on captured images obtained by a plurality of imaging apparatuses and access information for specifying access of material data for generating a virtual viewpoint image corresponding to the virtual viewpoint image data;

specifying the access information from the acquired virtual viewpoint image file;

requesting the material data by using the specified access information; and generating another virtual viewpoint image data based on the requested material data and another virtual viewpoint that differs from a virtual viewpoint corresponding to the virtual viewpoint image data included in the acquired virtual viewpoint image file.

17. A non-transitory computer-readable storage medium storing a program for performing a generation method, the method comprises:

acquiring a virtual viewpoint image file including virtual viewpoint image data generated based on captured images obtained by a plurality of imaging apparatuses and access information for specifying access of material data for generating a virtual viewpoint image corresponding to the virtual viewpoint image data;

specifying the access information from the acquired virtual viewpoint image file;
requesting the material data by using the specified access information; and
generating another virtual viewpoint image data based on the requested material data and another virtual viewpoint that differs from a virtual viewpoint corresponding to the virtual viewpoint image data included in the acquired virtual viewpoint image file.

* * * * *